United States Patent
Lucas

(10) Patent No.: US 8,652,327 B2
(45) Date of Patent: Feb. 18, 2014

(54) FILTER WITH MAIN AND SUPPLEMENTAL FILTER ELEMENTS AND OPTIONAL BUBBLE BREAKER

(75) Inventor: Daniel Lucas, Fayetteville, NC (US)

(73) Assignee: MANN+HUMMEL Purolator Filters LLC, Fayetteville, NC (US)

(*) Notice: Subject to any disclaimer, the term of this patent is extended or adjusted under 35 U.S.C. 154(b) by 415 days.

(21) Appl. No.: 12/881,703

(22) Filed: Sep. 14, 2010

(65) Prior Publication Data

US 2011/0062072 A1 Mar. 17, 2011

Related U.S. Application Data

(60) Provisional application No. 61/242,622, filed on Sep. 15, 2009, provisional application No. 61/242,615, filed on Sep. 15, 2009.

(51) Int. Cl.
*B01D 27/00* (2006.01)
*B01D 29/00* (2006.01)
*B01D 35/00* (2006.01)

(52) U.S. Cl.
USPC ........... 210/256; 210/261; 210/315; 210/337; 210/335; 210/314; 210/342; 210/338; 210/DIG. 5

(58) Field of Classification Search
USPC .............. 210/315, 323.2, 337, 335, 314, 342, 210/338, 339, DIG. 5, 493.2, 256, 261, 295, 210/323.1
See application file for complete search history.

(56) References Cited

U.S. PATENT DOCUMENTS

| | | | |
|---|---|---|---|
| 2,864,505 A | | 12/1958 | Kaston |
| 4,372,847 A | * | 2/1983 | Lewis ............................ 210/86 |
| 4,626,348 A | | 12/1986 | Stone |
| 5,447,627 A | | 9/1995 | Loafman et al. |
| 6,103,119 A | * | 8/2000 | Clements et al. .......... 210/493.1 |

(Continued)

FOREIGN PATENT DOCUMENTS

| | | |
|---|---|---|
| DE | 2 251 130 | 5/1974 |
| DE | 34 40 506 A1 | 5/1986 |

(Continued)

OTHER PUBLICATIONS

International Search Report (Form PCT/ISA/210) dated Nov. 15, 2010, with Form PCT/ISA/237 and Form PCT/ISA/220 (Fifteen (15) pages).

(Continued)

*Primary Examiner* — Nam Nguyen
*Assistant Examiner* — Madeline Gonzalez
(74) *Attorney, Agent, or Firm* — Crowell & Moring LLP

(57) ABSTRACT

A fluid filter providing several degrees of filtering is designed to be receivable in a filter container that is closable by a cover. The filter itself includes both an annular main filter element, through which fluid to be filtered can pass radially to undergo primary filtration, and a supplemental filter element, to which fluid discharged from the main filter element passes to provide supplemental filtration additional to the primary filtration. The main filter element, the supplemental filter element, or both may be oblong or circular in cross section. At least one of a pair of end caps disposed on opposed ends of the main filter element carries the supplemental filter element as well as one end of the main filter element. That end cap may or may not be permanently secured to the one filter element end.

20 Claims, 11 Drawing Sheets

(56) References Cited

U.S. PATENT DOCUMENTS

| | | |
|---|---|---|
| 6,113,781 A | 9/2000 | Popoff et al. |
| 6,319,402 B1 | 11/2001 | Schwandt et al. |
| 6,350,379 B1 | 2/2002 | Roll et al. |
| 6,666,968 B2 | 12/2003 | Smith et al. |
| 6,787,033 B2 | 9/2004 | Beard et al. |
| 7,014,761 B2 | 3/2006 | Merritt et al. |
| 7,090,773 B2 | 8/2006 | Meddock et al. |
| 7,527,739 B2 | 5/2009 | Jiang et al. |
| 8,470,175 B2 * | 6/2013 | Lucas ............................ 210/256 |
| 2005/0252838 A1 | 11/2005 | Fisher |
| 2007/0084776 A1 | 4/2007 | Sasur |
| 2007/0289915 A1 * | 12/2007 | Jiang et al. .................... 210/338 |
| 2008/0078716 A1 | 4/2008 | Farmer |
| 2008/0245037 A1 * | 10/2008 | Rogers et al. ................. 55/385.3 |
| 2009/0065425 A1 | 3/2009 | Jiang |
| 2009/0211959 A1 | 8/2009 | Clint et al. |
| 2010/0206800 A1 | 8/2010 | Veit et al. |

FOREIGN PATENT DOCUMENTS

| | | |
|---|---|---|
| DE | 20 2005 014 451 U1 | 3/2007 |
| DE | 10 2008 020 223 A1 | 9/2009 |
| EP | 0 858 825 A1 | 8/1998 |
| EP | 2 226 107 B1 | 9/2010 |

OTHER PUBLICATIONS

International Preliminary Report on Patentability and Written Opinion (seven (7) pages) 2012, Mar. 29, 2012.

European Search Report dated Mar. 8, 2013 (Eleven (11) pages).

European Office Action dated Oct. 31, 2013 (five (5) pages).

* cited by examiner

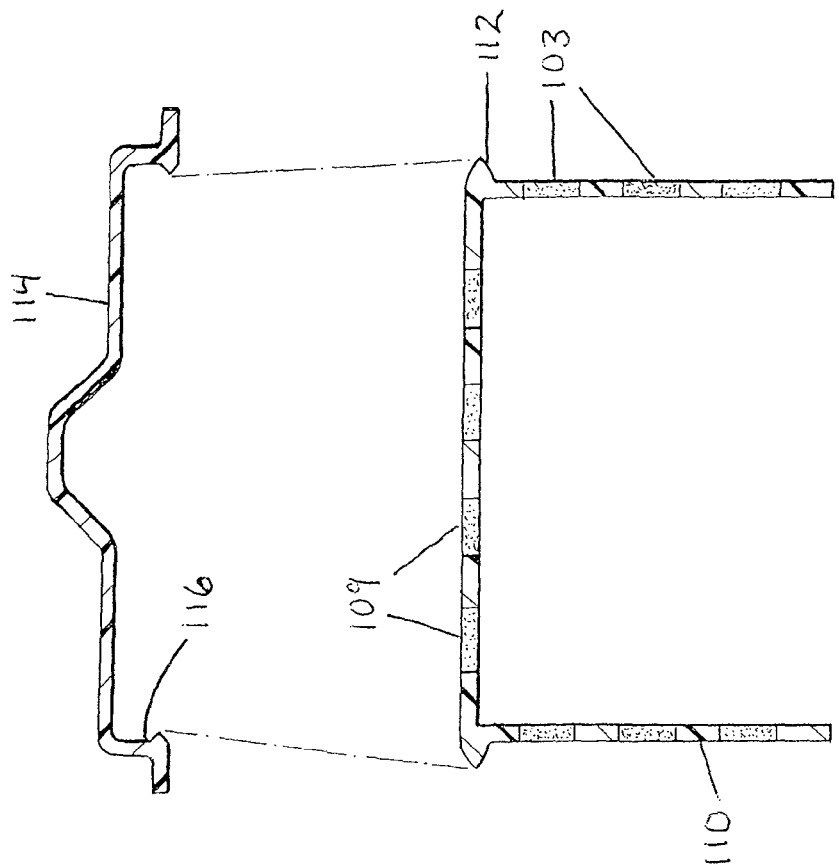
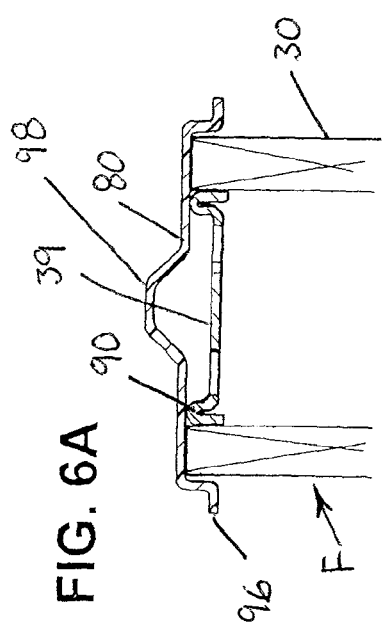
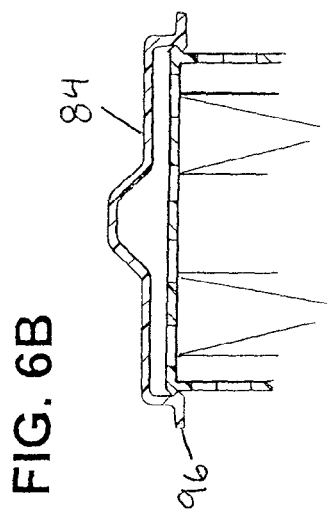
FIG. 7
FIG. 6A
FIG. 6B

FILTER WITH MAIN AND SUPPLEMENTAL FILTER ELEMENTS AND OPTIONAL BUBBLE BREAKER

This application claims priority to provisional U.S. Patent application 61/242,622, titled FILTER WITH OVAL OR FLAT-SIDES DESIGN, CCM/CLEANLINESS MEDIA GRADE, AND BUBBLE BREAKER, filed Sep. 15, 2009, the entire disclosure of which is incorporated herein.

Cross-reference is also made to U.S. Patent application publication 2011/0062075 A1, dated Mar. 17, 2011, titled SPACE REDUCING FILTER WITH SUPPLEMENTAL FLUID PROCESSING ELEMENT, which is based on U.S. patent application Ser. No. 12/881,866 as originally filed on Sep. 14, 2010, which claims priority to provisional U.S. Patent application 61/242,615, titled SPACE REDUCING FILTER WITH OVAL OR ROUND INNER DIAMETER, COALESCER, CCM/CLEANLINESS MEDIA GRADE, AND BUBBLE BREAKER, filed Sep. 15, 2009.

BACKGROUND OF THE INVENTION

1. Field of the Invention

The present invention concerns a filter, for fuel or other fluids, such as oils or other liquids, or even gases, that is preferably oval or flat-sided in cross-sectional configuration. A design according to this invention permits different functions to be included in an oval, flat-sided, or even round filter design, although an oval design is preferable to a flat design, as it more readily avoids collapse and makes it possible to integrate additional parts for cleanliness, water drainage for the clean side, and so on.

2. Description of Related Art

A brief discussion of certain filter systems for automotive or other applications utilizing multiple full flow and bypass filter arrangements is set forth in commonly assigned, co-pending U.S. patent application Ser. No. 12/467,423, filed May 18, 2009, titled Full Flow Liquid Filter with Integral Bypass Filtration. That discussion is partially reiterated here.

Filter systems for automotive or other applications commonly utilize one of two full flow filter and bypass filter configurations. One such configuration is an arrangement having two separate filtering systems, with a full flow system, which may include more than one filter, depending on flow requirements, and a bypass filter system, which processes only a small percentage of the full fluid volume. In such a configuration, an in-line, series approach is often utilized, with a full flow filter provided downstream of a bypass filter. These systems typically introduce additional costs and components for the automotive assembler and service industry to handle and manage. Vehicle weight is increased as well. U.S. Patent application publication 2008/0078716 to Farmer discloses one such in-line, series approach to filtering.

Evolutions of this configuration include systems having filters with full flow and bypass media stacked upon each other in the same filter housing. Examples of filters having stacked media include apparatuses disclosed by U.S. Patent application publication 2005/0252838 to Fisher and U.S. Pat. Nos. 5,447,627 to Loafman et al., 6,319,402 to Schwandt et al., and 6,350,379 to Roll et al.

Further developments have provided increased filtering capacity in the same or smaller footprint, while also offering high efficiency bypass filtration to "polish" the fluid system and provide integral soot filtration, by fitting bypass filters concentrically within full flow filters. U.S. Pat. Nos. 6,666,968 to Smith et al., 6,787,033 to Beard et al., 7,014,761 to Merritt et al., and 7,090,773 to Meddock et al. provide examples of such developments.

SUMMARY OF THE INVENTION

A fluid filter according to the invention is designed to be receivable in a filter container that is closable by a cover. The filter itself includes both an annular main filter element through which fluid to be filtered can pass radially to undergo primary filtration and a supplemental filter element to which fluid discharged from the main filter element passes to provide supplemental filtration additional to the primary filtration. The main filter element, the supplemental filter element, or both may be oblong or circular in cross section. At least one of a pair of end caps disposed on opposed ends of the main filter element carries the supplemental filter element as well as one end of the main filter element. That end cap may or may not be permanently secured to the one filter element end.

The fluid filter may additionally include a coalescer, which may surround the main filter element exterior, can be used to pre-process fluid to be filtered before that fluid undergoes the primary filtration. A frame, which may be securable to and detachable from the filter container cover, can be provided to mount both the supplemental filter element and the coalescer.

The supplemental filter can be configure to protrude from one of the end caps on which it is carried into a cavity defined at a downstream side of the main filter element. Optionally, the filter may include an arrangement by which bubbles in the fluid to be filtered are broken up and dissolved. Such a bubble breaker arrangement may be mounted in an appropriate location on one of the end caps.

BRIEF DESCRIPTION OF THE DRAWINGS

FIG. 6A is a view showing one configuration of the union between the top of the filter element and the cover according to FIG. 5A.

FIG. 6B is a view showing the configuration of the cover according to FIG. 5B.

FIG. 7 is an exploded view showing the snap union between the top of a combined coalescer and component cleanliness management (CCM), or cleanliness, medium structure, and a housing cover.

DETAILED DESCRIPTION OF THE INVENTION

Figure 1:
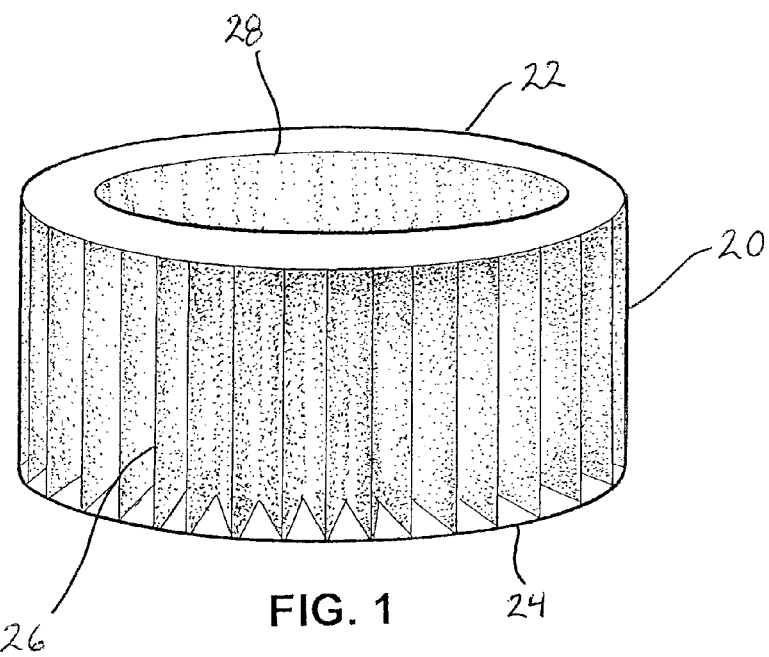
FIG. 1 is a schematic perspective view of a typical annular, preferably oval or flat (flattened) filter element.

FIG. 1 is a schematic perspective view of an oval or flat annular filter element without any "component cleanliness management (CCM)," or supplemental cleanliness medium filter element associated therewith. Fuel or other fluid traverses the filter element shown in FIG. 1 radially, and, as such, is filtered by the annular main filter element 20, the material 26 of which may be pleated in typical fashion. In its simplest configuration, the material is glued or bonded in some other way to oval, open-centered or ring-like end caps 22 and 24, which are disposed at axially opposed open ends of the main filter element 20. An uppermost open end 28 of the element 20 is visible in FIG. 1. The annular main filter element 20 provides fine particle filtration to fluid passing radially through the material 26 in a conventional manner.

Figure 2:
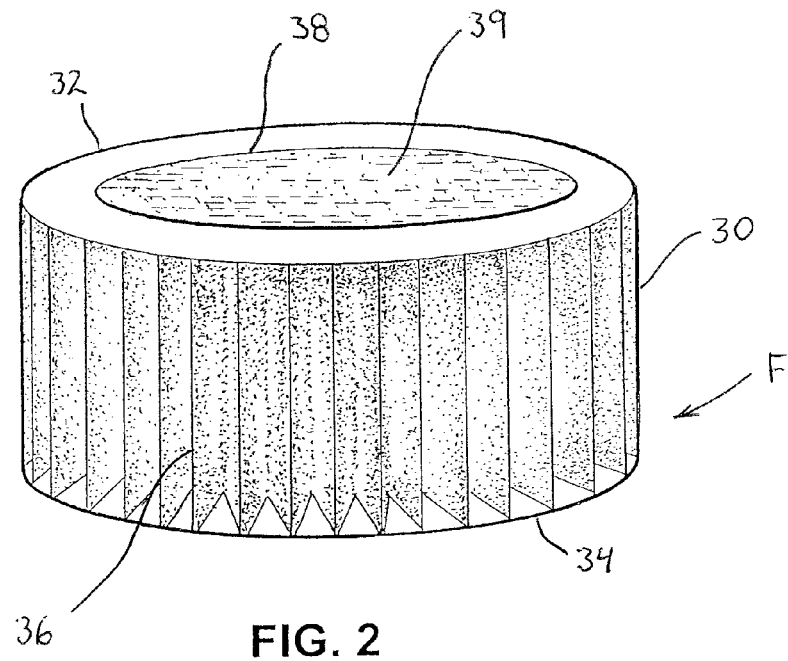
FIG. 2 is a schematic perspective view of an annular, preferably flattened filter element according to one embodiment of the invention.

FIG. 2 is a schematic perspective view of an oval or flattened filter F according to a first embodiment of the invention having an annular main filter element 30. As with the conventional element illustrated in FIG. 1, fuel or other fluid traverses the filter element 30 radially, passing through the material 36, which, again, may be pleated. Oval, open-centered or ring-like end caps 32 and 34 are disposed at axially opposed ends of the main filter element 30.

The main filter element 30 includes a pair of open axial ends similar to those present in the conventional configuration shown in FIG. 1. The uppermost open end 38 of the filter element 30 is visible in FIG. 2. Also visible in FIG. 2 is the flat outer surface of a supplemental or secondary cleanliness medium filter element 39, which is disposed at least partly within the open end 38 of the main filter element 30. Such supplemental cleanliness medium filter elements will hereafter be referred to simply as "supplemental filter elements." The main filter element 30, which is the same as the element 20 shown in FIG. 1, will not completely filter all particles out of the fluid being filtered. The supplemental filter element 39 has a finer pore size than that of the main filter element 30, or is otherwise configured to provide filtering beyond that provided by the main filter element 30, and operates to supply additional filtration of fluid that has already passed through the main filter element. By way of example only, and depending on customer requirements, the main filter element 30 may operate at 86% efficiency, while the supplemental filter element 39 operates at 95% efficiency. The arrangement illustrated in FIG. 2, and the arrangements shown in FIGS. 3-9 as well, may be referred to as "sky" designs, since supplemental cleanliness mediums are disposed at "upper" ends of the combined main filter/cleanliness medium filters and main filter/cleanliness medium filter/coalescer arrangements shown.

Figure 3:
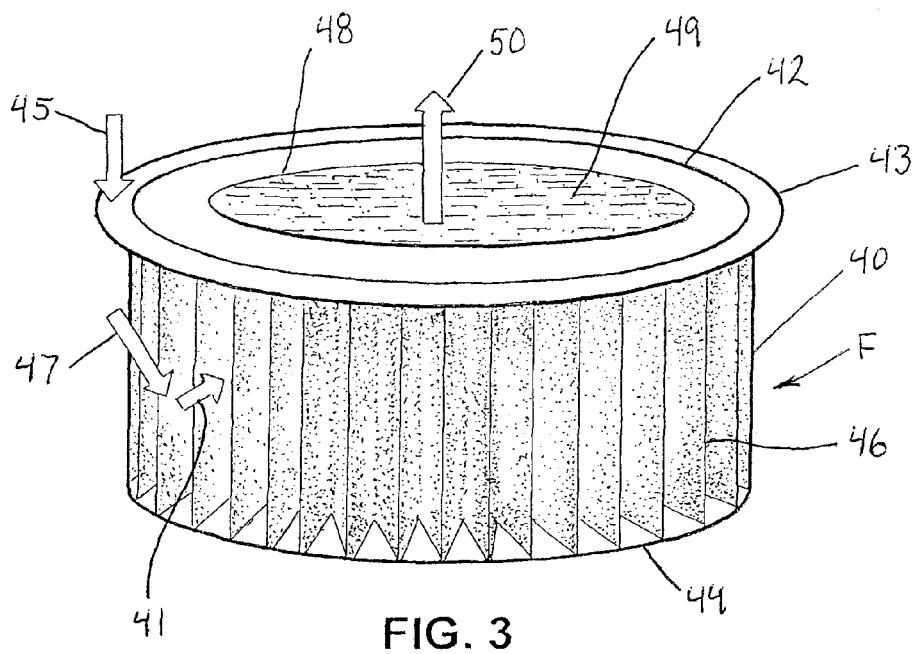
FIG. 3 is a schematic perspective view of an annular filter element according to another embodiment of the invention.

FIG. 3 is a schematic perspective view of another oval or flattened filter F having an annular main filter element 40. Fuel or another fluid travels relative to the filter element 40 along a path indicated by the various arrows. As in the embodiment shown in FIG. 2, this fluid traverses the filter element 40 radially, passing in the direction of an arrow 41 through the material 46, which, again, may be pleated. Oval, open-centered or ring-like end caps 42 and 44 are disposed at axially opposed ends of the main filter element 40.

The main filter F, or, more precisely, the main filter element 40, includes a pair of open axial ends; an uppermost open end 48 of the filter element 40 is indicated in FIG. 3. Also visible in FIG. 3 is the flat outer surface of a supplemental filter element 49, which is disposed at least partly within the open end 48 of the main filter element 40. As in the embodiment shown in FIG. 2, the supplemental filter element 49 has a finer pore size than that of the main filter element 40, or is otherwise configured to provide filtering beyond that provided by the main filter element 40, and operates to provide additional filtration of fluid that has already passed through the main filter element 40.

In this configuration, water-contaminated or dirty fuel received from a fuel tank (not shown) passes in the direction of an arrow 45 through a coalescer 43. This pre-filtered fuel then passes, as schematically indicated by the arrows 47 and 41, through the main filter material 46. The coalescer 43 is formed by an oval or oblong ring extending laterally with respect to a longitudinal axis of the main filter element 40. The coalescer 43 serves in a known manner to pre-filter or pre-process fuel arriving from the fuel tank by increasing water droplet size, facilitating water repellency of hydrophobic media included in the main filter. Typical coalescers are cellulose based or synthetic.

Water-contaminated or dirty fuel supplied in the direction of the arrow 45 from the fuel tank is processed sequentially as it travels in the directions indicated by the arrows, passing through the coalescer 43, the main filter element 40, and then the supplemental filter element 49 of the overall arrangement. As FIG. 3 shows, clean, fully processed, filtered fuel exits the overall filter F in the direction of an arrow 50, and can then be supplied to an engine (not shown).

Figure 4:
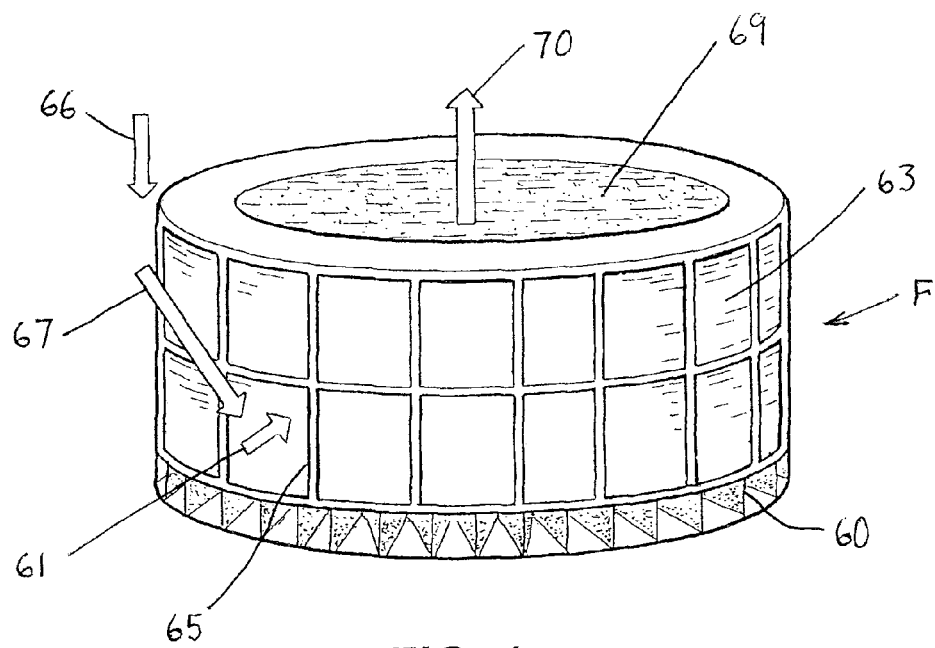
FIG. 4 is a schematic perspective view of an annular filter element according to yet another embodiment of the invention.

FIG. 4 is a schematic perspective view of another oval or flattened filter F with an oval or flattened annular main filter element 60. The flat surface of a supplemental filter element 69 is visible at one end of the filter F, and a coalescer 63, formed by a jacket extending parallel to a longitudinal axis of the main filter element 60, is mounted on the circumferential exterior of the main filter element 60. A cage or frame 65 may be used to retain the coalescer 63 on the circumferential exterior of the main filter element. The coalescer 63 may be either a single solid element, with the cage or frame 65 disposed around it, or composed of multiple individual coalescer elements received within openings defined by the cage or frame 65. Again, fuel from a fuel tank, which may initially be water-contaminated or dirty, travels in directions indicated by arrows 66, 67, and 61, sequentially passing through the coalescer 63, the main filter element 60, and the supplemental filter element 69 of the overall arrangement. Clean, fully processed, filtered fuel exits the overall filter F in the direction of an arrow 70, and can then be supplied to the engine.

Figure 5B:
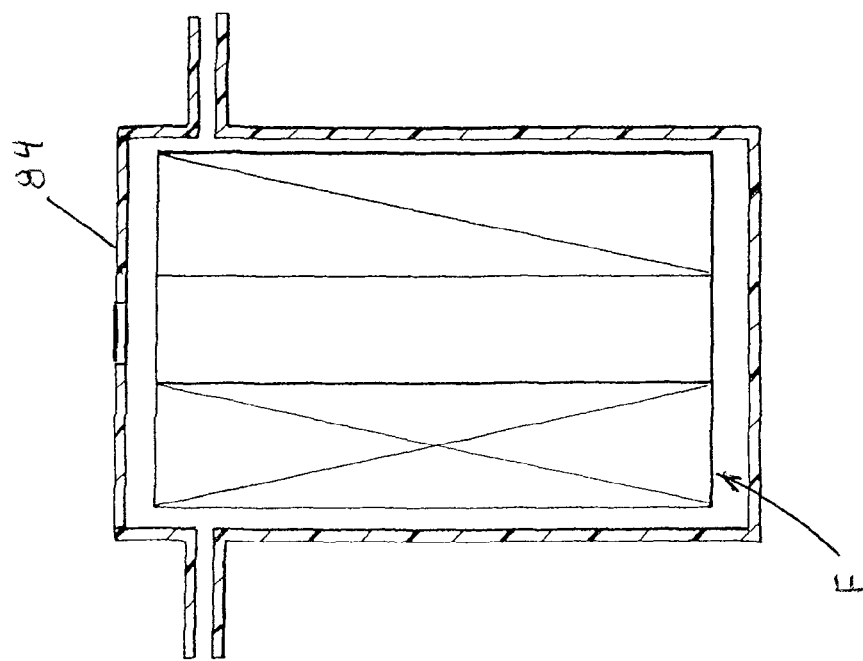
FIG. 5B is a schematic sectional view similar to FIG. 5A but of a configuration in which the filter element is not affixed to the filter element container cover so that the filter itself is serviceable.
Figure 5A:
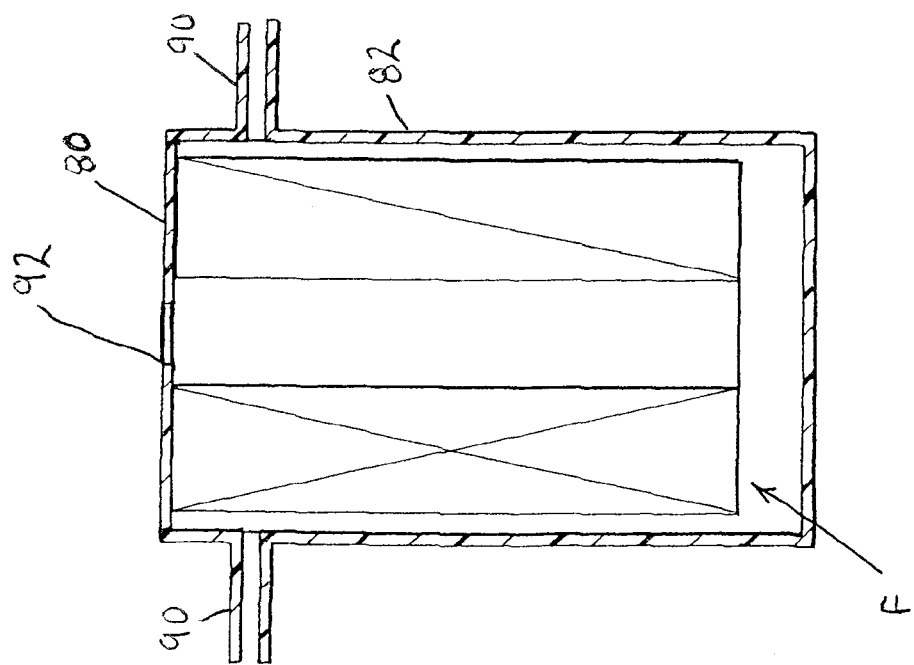
FIG. 5A is a schematic sectional view of a filtering system in which a filter element is glued or otherwise affixed to a filter element container cover.

FIG. 5A is a schematic sectional view of part of a filtering system in which a filter according to the invention, such as the filter F shown in FIG. 2, FIG. 3, or FIG. 4, is glued or otherwise affixed to the underside of a filter element container cover 80. The cover 80 is securable to and removable from a container body 82, and thus serves to close off the container body 82, in which a filtering process such as that described above in connection with FIGS. 2-4 occurs. Snaps, threads or other such features may be used to interconnect the cover 80 and the container body 82. Supply lines 90, by which water-contaminated, dirty fuel or other fluid may be supplied for filtering, are shown in schematic fashion as opening to the interior of the overall container formed by the cover 80 and the container body 82. Also illustrated schematically in FIG. 5A is a discharge line orifice or connection 92. It will be understood that fuel or another fluid to be filtered enters the container body 82, for example through one or more supply lines 90, passes radially through the main filter element 30, 40, or 60, passes through the supplemental filter element 39, 49, or 69, and is discharged from the container 82 through the discharge line orifice or connection 92.

The filter F may be affixed in any appropriate manner to the cover 80; depending on the material used for the cover 80, the filter F may be secured to the cover 80 by use of a chemical bonding solution, such as LOCTITE, by polyvinyl chloride (PVC) or polyurethane bonding techniques, by infrared or ultrasonic welding, or by way of appropriate extrusion techniques. When the filter F of the system shown in FIG. 5A becomes dirty, the cover 80 and filter F are both removed together and replaced.

FIG. 5B is a schematic sectional view similar to FIG. 5A but of a configuration in which the filter F is not affixed to the filter element container cover 84. When the filter F of the system shown in FIG. 5B becomes dirty, only the filter F needs to be replaced. The filter element container cover 84 is reusable.

A more detailed view of one configuration of a union between the top of a filter F and a cover 80 in an arrangement such as that shown in FIG. 5A is provided by FIG. 6A. For the purposes of illustration and this discussion only, it will be presumed that the filter F shown in FIGS. 5A and 6A has the configuration of the filter F shown in FIG. 2, and thus includes a main filter element 30 and a supplemental filter element 39 disposed at least partly within an open end of the main filter element 30. The supplemental filter element 39 includes an oval, central area surrounded by an upstanding, recurved, oval mounting flange 90 by which the supplemental filter element 39 is securable within the main filter element open end. The cover 80 shown in FIG. 6A has a closed center 98 instead of the discharge line orifice or connection 92 of FIG. 5A; the closed center 98 may be removed or punctured or otherwise penetrated to form an orifice for connection to the discharge line. An external thread or flange 96 may be disposed on the circumferential exterior of the cover 80 to cooperate with an internal thread or recess at the open end of the container body 82 in order to retain the cover in place. Other connections between the cover 80 and the open end of the container body 82 are useable.

FIG. 6B provides an illustration of a cover 84 in an arrangement in which a main filter element and a frame to which the filter element is secured are detachable. Again, an external thread or flange 96 may be disposed on the circumferential exterior of the cover 84 to cooperate with an internal thread or recess at the open end of the container body in order to retain the cover 84 in place. Again, other connections between the cover 84 and the container body are useable. The arrangement shown in FIG. 6b is also shown in the exploded view provided by FIG. 7, which schematically illustrates a plurality of individual supplemental filter elements 109 and a plurality of individual coalescer elements 103 mounted within a frame 110. The frame 110 shown has a circumferential lip 112, which is receivable within a groove or recess 116 defined on the inner circumference of a container cover 114 that is similar to the cover 84 shown in FIG. 6b. By snapping the lip 112 into the recess 116, the frame 110, including elements mounted therein that combine to provide functions of both a supplemental filter and a coalescer, is securable to and interlocks with the cover 114. The frame 110, with elements 103 and 109 secured therein, can then be placed over the exterior of the main filter element (not shown in FIG. 7).

Figure 8:
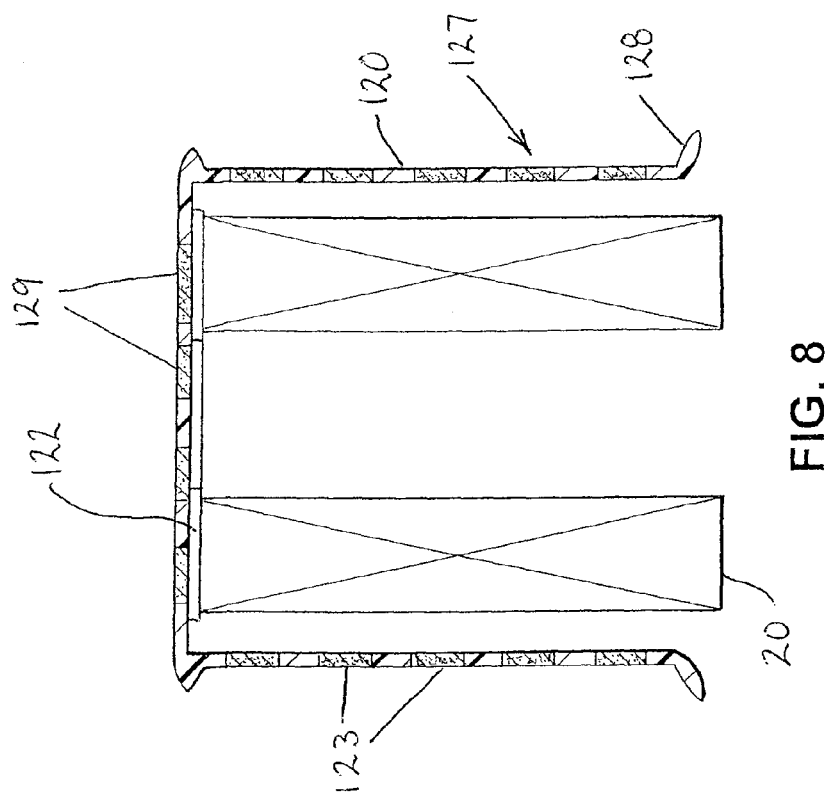
FIG. 8 is a sectional view of a combined coalescer and CCM medium structure showing a sealing lip.

A frame 120, which is essentially the same as the frame 110 of FIG. 7, is schematically shown in FIG. 8 as attached, by an annular layer 122 of glue, for example, to an end of a conventional main filter element, such as the conventional main filter element 20 shown in FIG. 1 and described above. By attaching the frame 120, including individual supplemental filter elements 129 and individual coalescer elements 123, to the filter element 20, it is possible to produce an overall filter element having combined main filtering, auxiliary filtering, and coalescing properties. FIG. 8 also illustrates an annular lip extending around a bottom end of the combined coalescer and cleanliness medium structure to provide a seal between the overall jacket 127 and the housing. More specifically, the frame 120 illustrated in FIG. 8 has a circumferential lip 128 of plastic surrounding its open end opposite the end receiving the supplemental filter elements 129. The lip 128 is provided to produce a seal between the external housing (not shown in FIG. 8), within which the jacket 127 formed by the combination of the frame 120 and the elements 123 and 129 is received, and that frame 120. The lip 128 thus facilitates fluid flow along an appropriate path.

Figure 9:
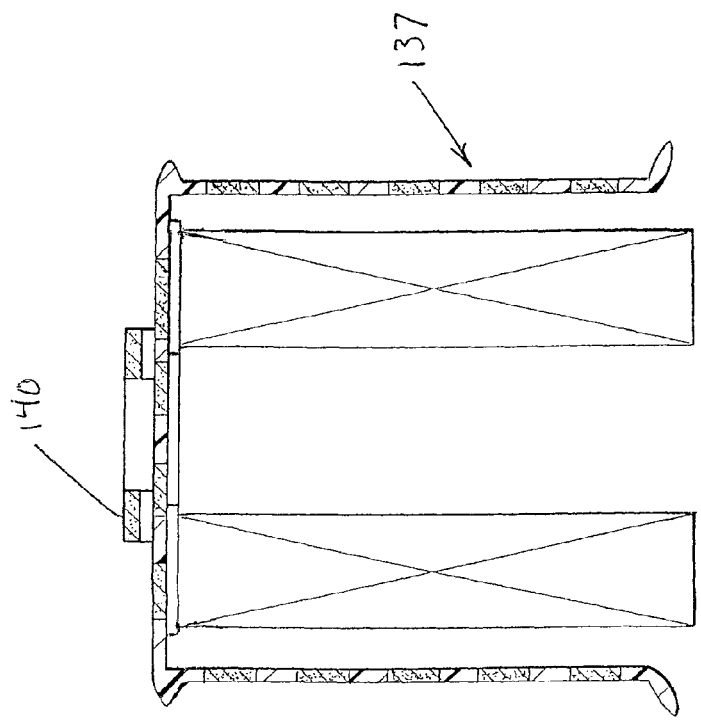
FIG. 9 is a sectional view similar to that provided by FIG. 8 but in which the combined coalescer and CCM medium structure is provided with a bubble breaker.

The jacket 137 illustrated in FIG. 9 is essentially the same as the jacket 127 shown in FIG. 8, except that it has a schematically shown bubble breaker 140 formed or mounted on its end. The bubble breaker 140 is optional, includes an open medium, and may be integrated with the filter to dissolve or reduce sizes of air pockets or bubbles in fluid passing through the filter. Once the bubble breaker 140 has eliminated unwanted air from the fuel or other fluid, "de-bubbled" fuel or fluid is discharged back into the fluid flow.

Figure 10:
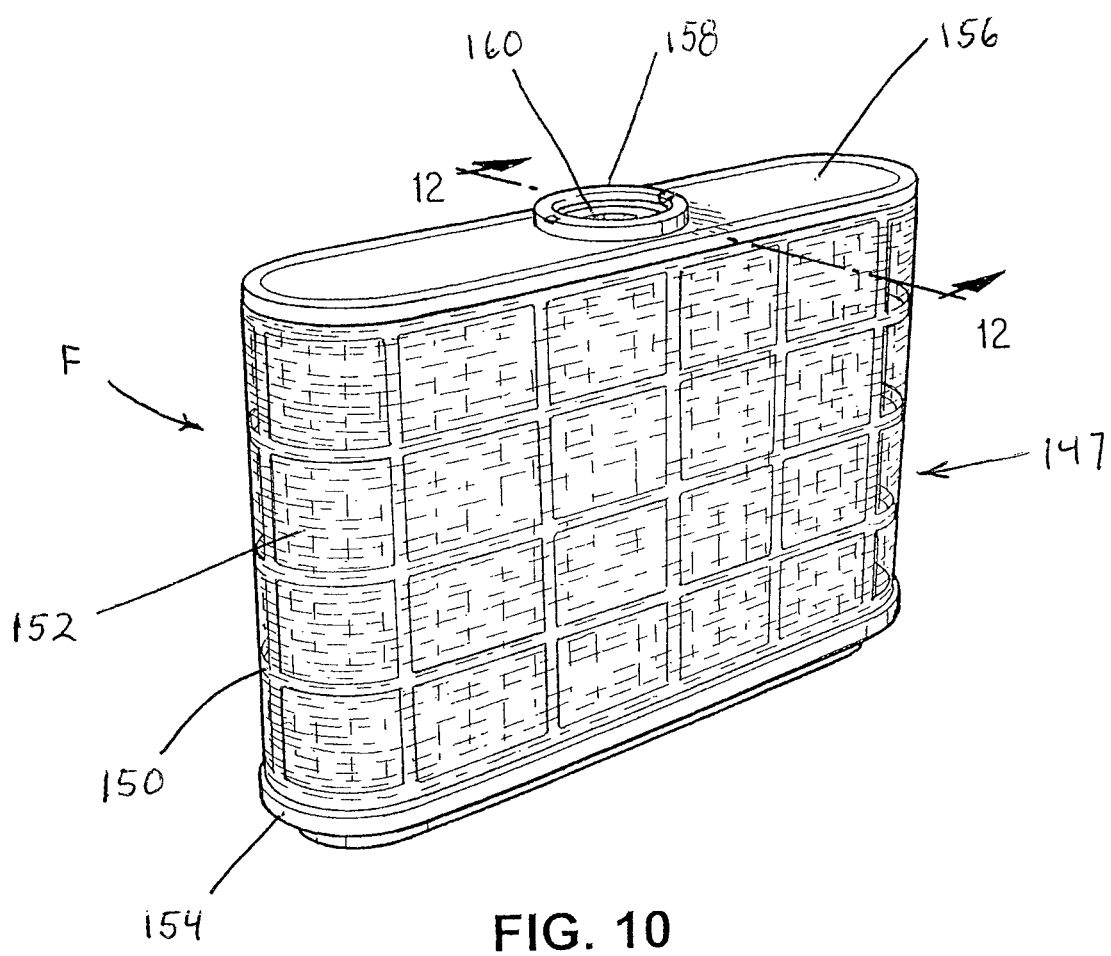
FIG. 10 is a external perspective view from above another arrangement that operates similarly to that shown in FIG. 9.

The arrangement illustrated in FIGS. 10-17 is similar to that shown in FIG. 9, but differs in terms of placement of the supplemental filter element added to provide the additional filtering discussed above. FIG. 10 is a external perspective view from above a filter F, and shows a jacket 147, including an outer frame 150 supporting a coalescer element 152. A plurality of individual coalescer elements could alternatively be used. The frame 150 shown has a circumferential lip 154 at its lower end. This lip 154 functions in the same way as the lip 128 illustrated in FIG. 8 to facilitate fluid flow along an appropriate path by cooperation with an external housing (not shown). It will be understood that the extension angle of the lip 154 can be modified to adjust the degree of sealing with the interior of the external housing; as this extension angle is decreased, pressure of the lip against the housing interior decreases, and sealing decreases accordingly.

Figure 11:
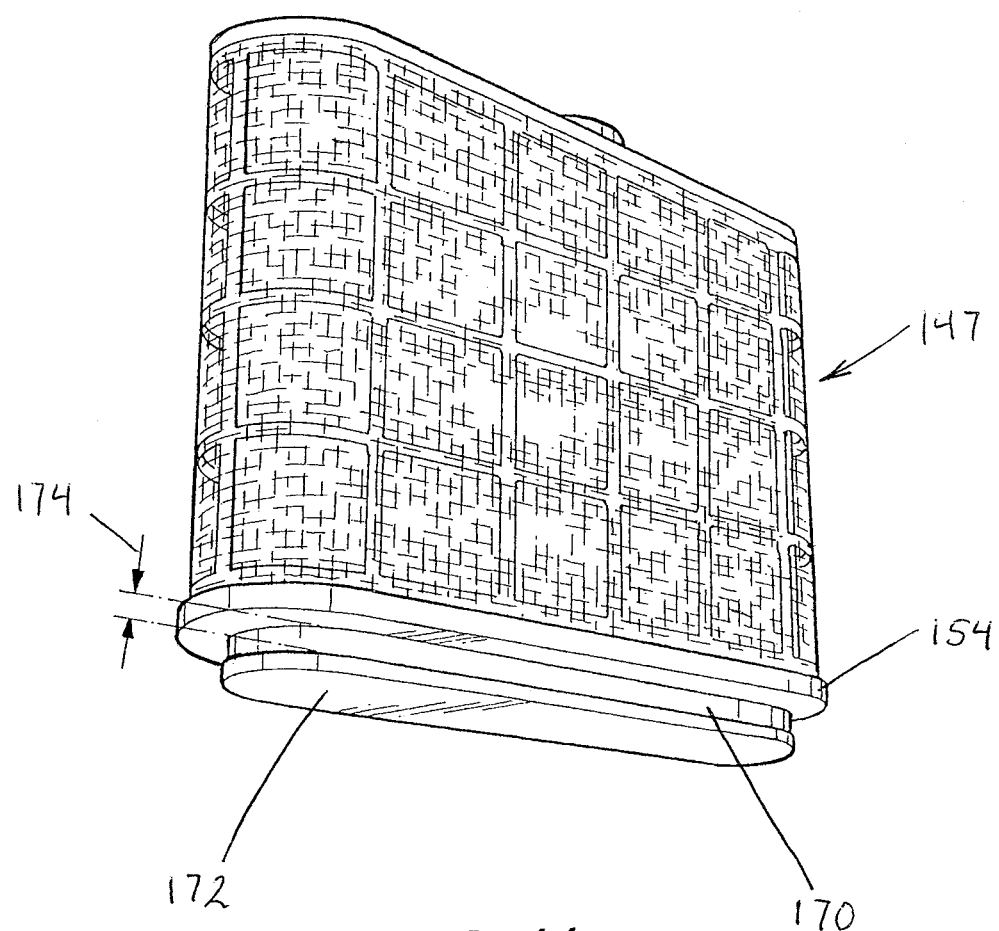
FIG. 11 is an external perspective view from below the arrangement shown in FIG. 10.

Also evident in FIG. 10 are an upper end cap 156 and a bubble breaker 158 surrounding a discharge line orifice or connection 160, which is essentially the same as the discharge line orifice or connection 92 represented in FIG. 5A. The corresponding view from below the filter F provided by FIG. 11 shows the lowermost part of a main filter element 170, the central opening of which is closed of by a lower end cap 172. The lip 154, forming the terminus of the jacket 147, is displaced a distance 174 above the bottom of the main filter element 170. As with other main filter elements described above, the main filter element 170 may be formed of material that is pleated in typical fashion.

Figure 12:
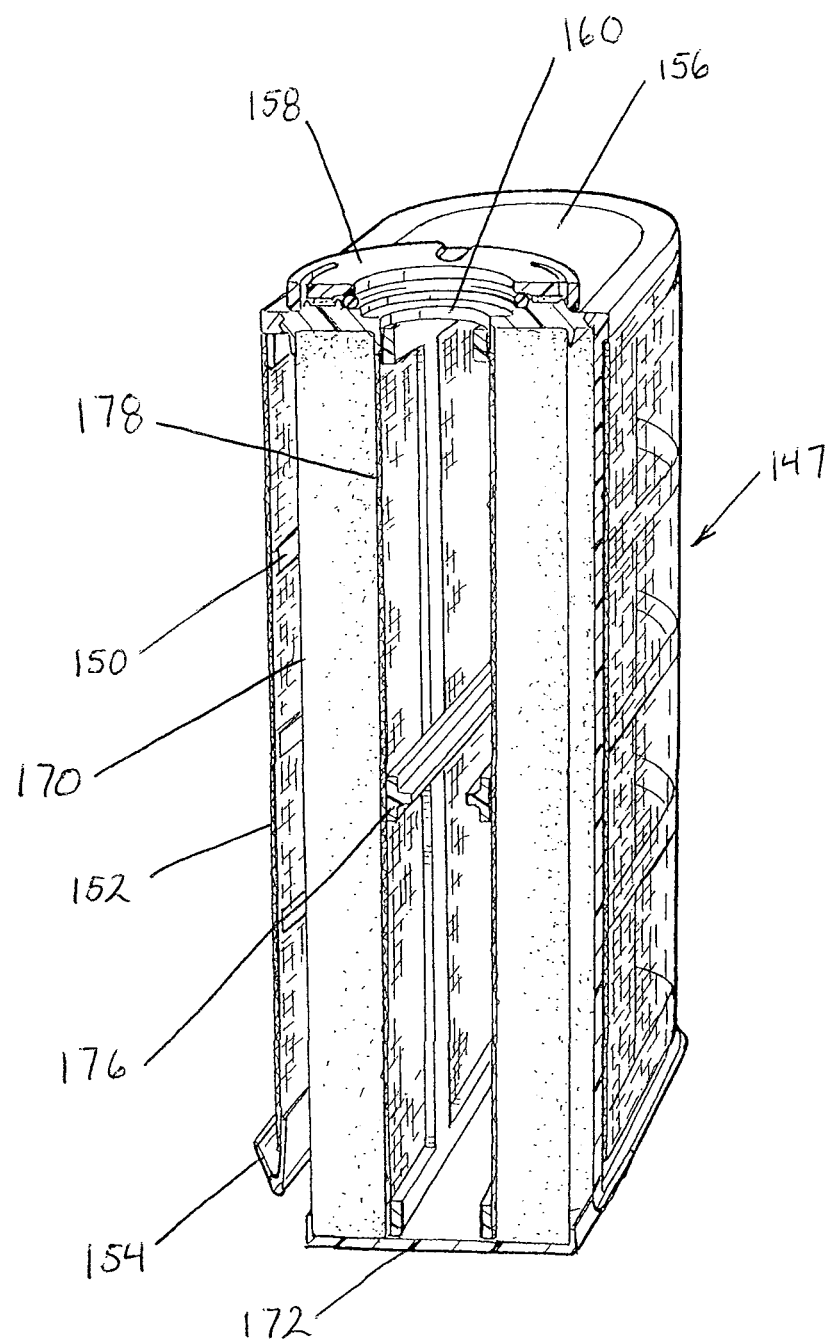
FIG. 12 is a cut-away sectional view of the arrangement shown in FIG. 10 as seen along line 12-12.
Figure 13:
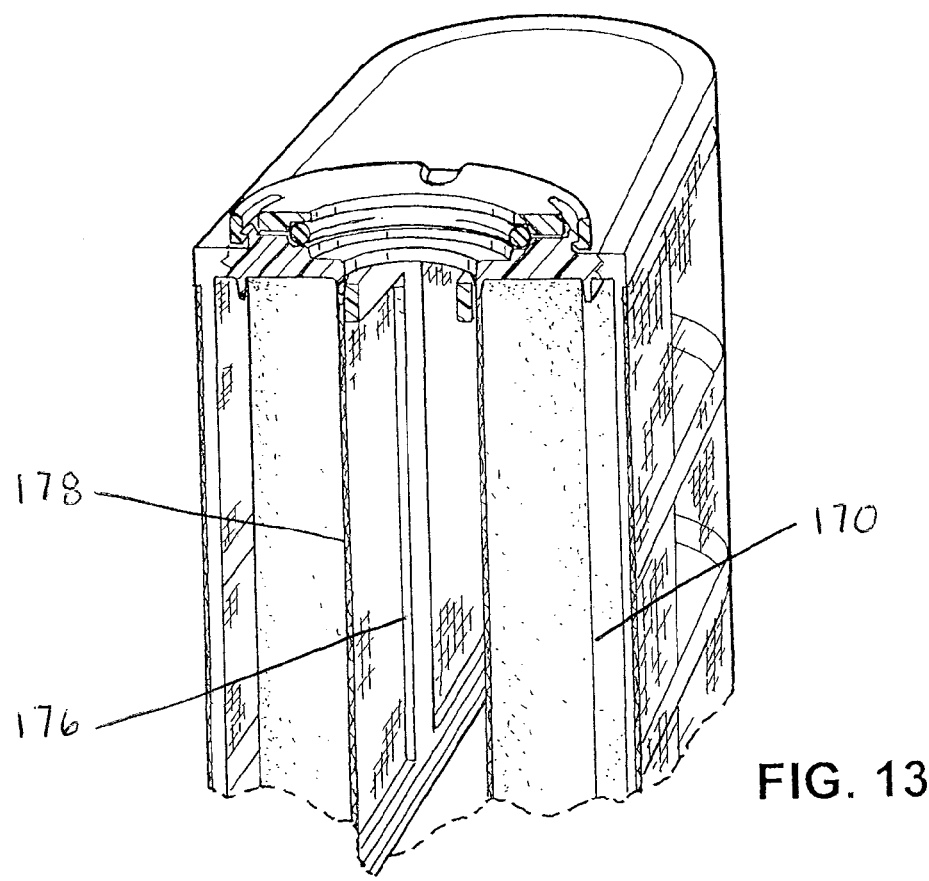
FIG. 13 is an enlarged view of part of the arrangement shown in FIG. 12.

The jacket 147, the frame 150, the coalescer element 152, the circumferential lip 154, the upper end cap 156, the bubble breaker 158, the discharge line orifice or connection 160, the main filter element 170, and the lower end cap 172 are all evident in the cut-away sectional view provided by FIG. 12.

Also evident in FIG. 12 is an inner frame 176 used to support a supplemental filter element 178. As with the arrangements described previously, this supplemental filter element 178 serves to provide filtering beyond that provided by the main filter element 170 by way of additional filtration of fluid that has already passed through the main filter element 170. In the arrangement of FIG. 12, however, the additional or supplemental filter element 178 is retained against or adjacent to the radial interior of the main filter element 170 by the inner frame 176. This is also apparent from the somewhat enlarged view provided by FIG. 13.

Figure 14:
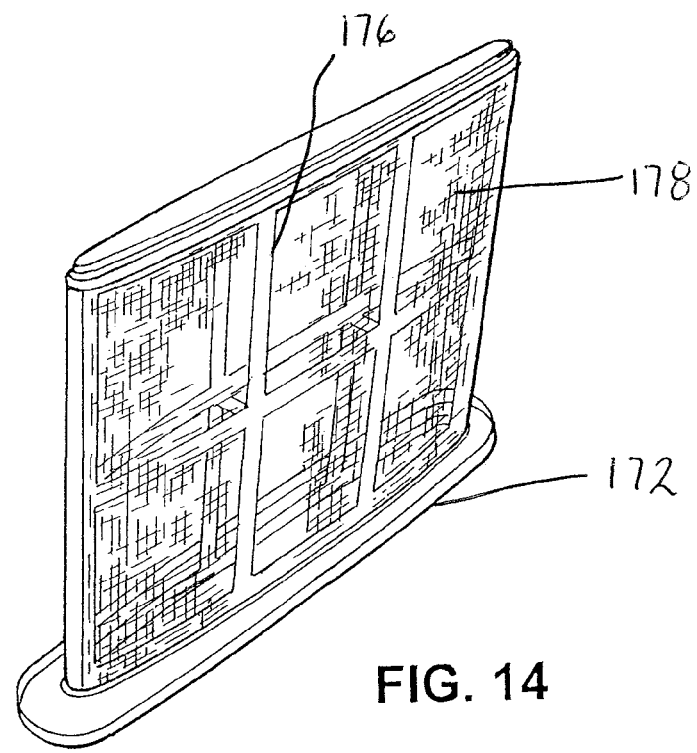
FIG. 14 is a perspective view of the inner jacket and media arrangement of FIG. 12.
Figure 15:
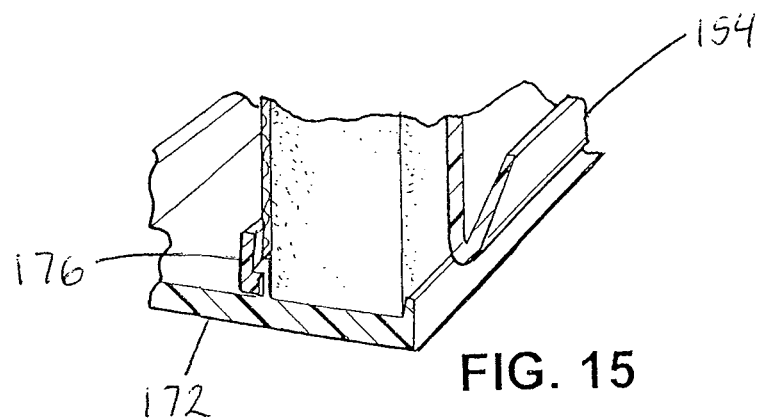
FIG. 15 is a view illustrating a snap union I-jacket with a bottom end cap.

The perspective view provided by FIG. 14 shows the supplemental filter element 178 and the inner frame 176 as separated from the remainder of the arrangement illustrated in FIG. 10. It will be understood that the inner frame 176 is united with the lower end cap 172 in an appropriate way such as by snap connections. One such snap connection is shown in FIG. 15. FIG. 15 also shows a portion of the circumferential lip 154 at the lower end of the frame 150. It will be understood from considering FIGS. 12 and 16 together that the supplemental filter element 178 protrudes from the lower end cap on which it is carried into the central cavity defined by the annular main filter element 170 at its downstream side.

Figure 16:
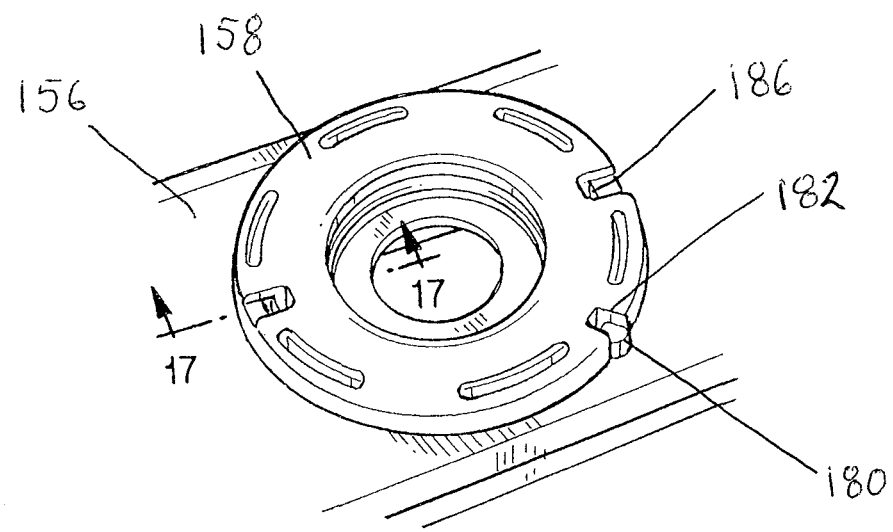
FIG. 16 is a perspective view from above the bubble breaker of FIG. 10.
Figure 17:
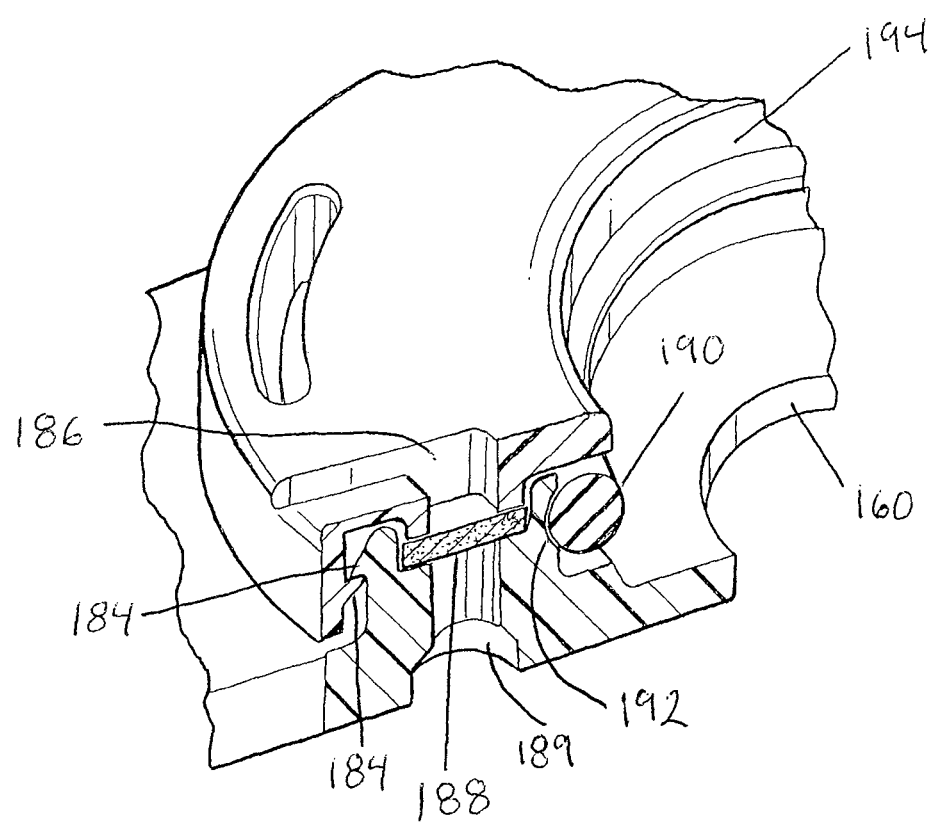
FIG. 17 is an enlarged, part sectional view along line 17-17 of FIG. 16.

FIG. 16 provides a perspective view from above the bubble breaker 158, while FIG. 17 is an enlarged, part sectional view of the structure shown in FIG. 16. One conceivable way to secure the bubble breaker 158 in place is to first appropriately position the bubble breaker 158 on the upper end cap 156, for example by way of a protrusion 180 on the cap 156 that cooperates with a slot 182 in the bubble breaker 158 as shown in FIG. 16. The bubble breaker 158 can then be pressed into connection with the upper end cap and retained in place over the discharge line connection 160 by cooperating snap elements 184 (visible in FIG. 17) on the bubble breaker and the end cap.

Air pockets or bubbles entrained in fluid supplied to the interior of a container body, such as the container body 82 shown in FIG. 5A, tend to rise within the container body interior. Fluid pressure causes the bubbles to proceed into bubble inlets 186. As the fluid in which the bubbles are entrained passes into the bubble inlets 186, through filter media 188, through passages 189, and back upstream of the main filter element 170, the bubbles are broken up so that they will not adversely affect an engine or other item to which the fluid passing through the filter is supplied. An o-ring seal 190 facilitating fluid tight connection between the discharge line orifice or connection 160 and a discharge line (not shown) is retained in position by an appropriate groove 192 formed in the upper end cap 156. An appropriate flange 194 on the bubble breaker 158 can also extend over the seal 190 to assist in proper retention of the seal.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A fluid filter comprising:
    an annular main filter element through which fluid to be filtered can pass radially to undergo primary filtration;
    a supplemental filter element to which fluid discharged from the main filter element passes to provide supplemental filtration additional to the primary filtration;
    end caps disposed on opposed ends of said main filter element, at least one of the end caps carrying the supplemental filter element as well as one end of the main filter element; and
    a frame within which the annular main filter element, the supplemental filter element, and at least one of the end caps are received, the frame having openings defined therein, some of the openings receiving individual supplemental filter elements and others of the openings receiving individual coalescer elements, a combination of the frame, the individual supplemental filter elements, and the coalescer elements defining a jacket including an end wall and an annular side wall projecting from the end wall.

2. The fluid filter of claim 1, wherein the individual coalescer elements pre-process fluid to be filtered before the fluid undergoes the primary filtration.

3. The fluid filter of claim 2, wherein the frame surrounds an exterior of the main filter element.

4. The fluid filter of claim 2, wherein the frame includes a circumferential lip projecting radially beyond the annular side wall to facilitate interconnection of the frame with a container cover.

5. The fluid filter of claim 1, wherein the frame includes a circumferential lip projecting radially beyond the annular side wall to facilitate interconnection of the frame with a container cover.

6. The fluid filter of claim 1, further comprising an arrangement by which bubbles in the fluid to be filtered are broken up and dissolved that is mounted on one of the end caps.

7. The fluid filter of claim 1, wherein the main and supplemental filter elements are oblong in cross section.

8. The fluid filter of claim 1, wherein the main and supplemental filter elements are circular in cross section.

9. The fluid filter of claim 2, further comprising an arrangement by which bubbles in the fluid to be filtered are broken up and dissolved that is mounted on one of the end caps.

10. A fluid filter receivable in a filter container that is closable by a cover, comprising:
    an annular main filter element through which fluid to be filtered can pass radially to undergo primary filtration;
    a supplemental filter element to which fluid discharged from the main filter element passes to provide supplemental filtration additional to the primary filtration;
    end caps disposed on opposed ends of said main filter element, at least one of the end caps carrying the supplemental filter element as well as one end of the main filter element; and
    a frame within which the annular main filter element, the supplemental filter element, and at least one of the end caps are received, the frame having openings defined therein, some of the openings receiving individual supplemental filter elements and others of the openings receiving individual coalescer elements, a combination of the frame, the individual supplemental filter elements, and the coalescer elements defining a jacket including an end wall and an annular side wall projecting from the end wall.

11. The fluid filter of claim 10, wherein at least one of said end caps is permanently secured to said one end of said main filter element.

12. The fluid filter of claim 10, wherein the individual coalescer elements pre-process fluid to be filtered before the fluid undergoes the primary filtration.

13. The fluid filter of claim 12, wherein the frame includes a circumferential lip projecting beyond the annular side wall to facilitate interconnection of the frame with said cover.

14. The fluid filter according to claim 13, wherein said frame is securable to and detachable from said cover of the filter container.

15. The fluid filter of claim 12, wherein the frame surrounds an exterior of the main filter element.

16. The fluid filter of claim 10, wherein the frame includes a circumferential lip projecting beyond the annular side wall to facilitate interconnection of the frame with said cover.

17. The fluid filter of claim 10, further comprising an arrangement by which bubbles in the fluid to be filtered are broken up and dissolved that is mounted on one of the end caps.

18. The fluid filter of claim 10, wherein the main and supplemental filter elements are oblong in cross section.

19. The fluid filter of claim 10, wherein the main and supplemental filter elements are circular in cross section.

20. The fluid filter of claim 12, further comprising an arrangement by which bubbles in the fluid to be filtered are broken up and dissolved that is mounted on one of the end caps.

* * * * *